United States Patent
Sluijs et al.

(10) Patent No.: US 10,447,068 B2
(45) Date of Patent: Oct. 15, 2019

(54) POWER MANAGEMENT CIRCUIT

(71) Applicant: NXP B.V., Eindhoven (NL)

(72) Inventors: Ferdinand Jacob Sluijs, Nijmegen (NL); Marcel Wilhelm Rudolf Martin van Roosmalen, Wijchen (NL)

(73) Assignee: NXP B.V., Eindhoven (NL)

(*) Notice: Subject to any disclaimer, the term of this patent is extended or adjusted under 35 U.S.C. 154(b) by 94 days.

(21) Appl. No.: 15/477,199

(22) Filed: Apr. 3, 2017

(65) Prior Publication Data
US 2018/0287419 A1    Oct. 4, 2018

(51) Int. Cl.
H02J 7/04 (2006.01)
H02J 7/00 (2006.01)
G01C 19/00 (2013.01)

(52) U.S. Cl.
CPC ............ H02J 7/042 (2013.01); H02J 7/0029 (2013.01); H02J 7/0045 (2013.01); *G01C 19/00* (2013.01)

(58) Field of Classification Search
CPC .......... H02J 7/042; H02J 7/0045; G01C 19/00
USPC ................................. 320/107, 108
See application file for complete search history.

(56) References Cited

U.S. PATENT DOCUMENTS

| 5,956,626 | A | 9/1999 | Kaschke et al. |
| 6,188,554 | B1 | 2/2001 | Chung |
| 8,169,196 | B2 | 5/2012 | Vantu et al. |
| 9,158,325 | B1* | 10/2015 | Lim ................. H02J 7/0052 |
| 2015/0201385 | A1* | 7/2015 | Mercer ............. H04B 1/3838 455/452.1 |
| 2016/0353519 | A1* | 12/2016 | Kogen ................. H04W 88/02 |
| 2017/0066334 | A1* | 3/2017 | Sindia ................ B60L 11/182 |
| 2017/0143984 | A1* | 5/2017 | Otten ................... A61N 5/025 |

FOREIGN PATENT DOCUMENTS

WO    WO 2016/170007 A1    10/2016
WO    WO 2017/039886 A1    3/2017

OTHER PUBLICATIONS

Unknown; "Proximity Sensor on Android Gingerbread"; retrieved from the internet http://thecodeartist.blogspot.nl/2011/01/proximity-sensor-on-android-gingerbread.html on Mar. 23, 2017; pp. 1-2 (2011).

* cited by examiner

*Primary Examiner* — Richard Isla
*Assistant Examiner* — Johali A Torress Ruiz

(57) ABSTRACT

One example discloses a power management circuit, wherein the power management circuit is configured to cause a device to be operated at a first power level and a second power level. The circuit includes: an RF transmitter configured to generate an RF signal having a set of transmitted RF signal attributes; an RF receiver configured to detect the RF signal having a set of received RF signal attributes; and a proximity detection circuit configured to transition the device from the first power level to the second power level in response to a preselected difference between the transmitted set of RF signal attributes and the received set of RF signal attributes.

16 Claims, 6 Drawing Sheets

POWER MANAGEMENT CIRCUIT

The present specification relates to systems, methods, apparatuses, devices, articles of manufacture and instructions for power management.

SUMMARY

According to an example embodiment, a power management circuit, comprising: wherein the power management circuit is configured to cause a device to be operated at a first power level and a second power level; an RF transmitter configured to generate an RF signal having a set of transmitted RF signal attributes; an RF receiver configured to detect the RF signal having a set of received RF signal attributes; and a proximity detection circuit configured to transition the device from the first power level to the second power level in response to a preselected difference between the transmitted set of RF signal attributes and the received set of RF signal attributes.

In another example embodiment, the first power level is higher than the second power level.

In another example embodiment, the first and second power levels are non-zero.

In another example embodiment, the first power level includes a first current level for charging the device; and the second power level includes a second current level, less than the first current level, for charging the device.

In another example embodiment, the first power level includes a first voltage level for charging the device; and the second power level includes a second voltage level, less than the first current level, for charging the device.

In another example embodiment, the transmitted and received attributes include at least one of: an amplitude, a phase, an impedance, and an RF signal power level.

In another example embodiment, the transmitted and received attributes are configured to vary based on at least one of: a proximity of a user's hand, skin or clothing to the device, a proximity of an object, such as another device, a desk surface, a smartphone, or a battery charger, next to the device, and a proximity of a user's hand to a cable connected to the device.

In another example embodiment, the proximity detection circuit is configured to transition the device from the first power level to the second power level in response to a preselected variation in the difference between the transmitted set of attributes and the received set of attributes over a preselected time period.

In another example embodiment, the proximity detection circuit is configured to not transition the device from the first power level to the second power level if the preselected variation in the difference between the transmitted set of attributes and the received set of attributes does not vary over the preselected time period.

In another example embodiment, further comprising an accelerometer configured to detect movement of the device.

In another example embodiment, the proximity detection circuit is configured to transition the device from the first power level to the second power level in response to either or both the preselected difference between the transmitted set of attributes and the received set of attributes, or movement of the device.

In another example embodiment, the power management circuit is embedded in at least one of: a battery charger, a mobile charger, or a battery powered device.

In another example embodiment, further comprising a power source; wherein the power source is at least one of: a main AC source, or another battery; and wherein the proximity detection circuit is configured to transition the power source from the first power level to the second power level in response to the preselected difference between the transmitted set of attributes and the received set of attributes.

In another example embodiment, further comprising a connector coupled to an external surface of the device; wherein the RF transmitter and RF receiver are coupled to the connector; and wherein the connector is configured to transmit and receive the RF signal.

In another example embodiment, the RF transmitter is configured to pulse the RF signal; a frequency of the RF signal is set based on a predefined rate at which the preselected difference between the transmitted set of attributes and the received set of attributes changes; and a frequency of the RF signal is set based on a predefined rate at which a user's hand can disrupt charging of the device.

In another example embodiment, further comprising, a power source; and a cable, configured to carry the RF signal, and configured to couple the power source to the device; and wherein the proximity detection circuit is configured to transition the device from the first power level to the second power level in response to an object near the cable.

According to an example embodiment, an article of manufacture including at least one non-transitory, tangible machine readable storage medium containing executable machine instructions for power management, comprising: wherein the article includes, a power management circuit; an RF transmitter; an RF receiver; a proximity detection circuit; and wherein the instructions include: configuring a device to be operated at a first power level or a second power level in response to control signals from the power management circuit; generating an RF signal having a set of transmitted RF signal attributes with the RF transmitter; detecting the RF signal having a set of received RF signal attributes with the RF receiver; and transition the device operational configuration from the first power level to the second power level in response to a preselected difference between the transmitted set of RF signal attributes and the received set of RF signal attributes with the proximity detection circuit.

According to an example embodiment, a method for power management, comprising: configuring a device to be operated at a first power level or a second power level; generating an RF signal having a set of transmitted RF signal attributes; detecting the RF signal having a set of received RF signal attributes; and transition the device operational configuration from the first power level to the second power level in response to a preselected difference between the transmitted set of RF signal attributes and the received set of RF signal attributes.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
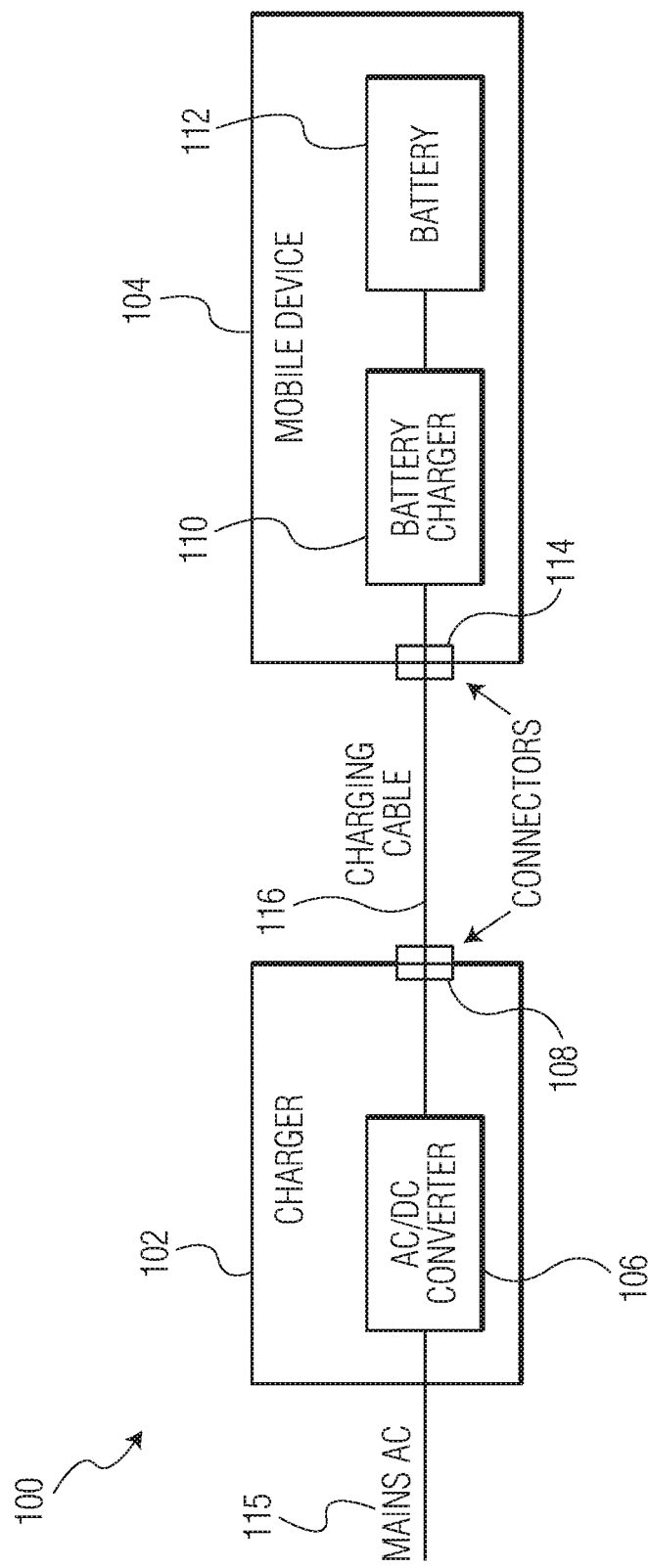
FIG. 1 is a first example of charging between a first device and a second device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

FIG. 1 is a first example 100 of charging between a first device 102 and a second device 104. In this example the first device 102 is a charger and the second device 104 is a mobile device.

The first device 102 includes an AC/DC converter 106 and a first connector 108. The second device 104 includes a battery charger 110, a battery 112, and a second connector 114.

The first device 102 is connected to a mains AC 115 (e.g. an AC wall outlet power source) and a first end of a charging cable 116. The second device 104 is coupled to a second end of the charging cable 116. During charging, power at a fixed voltage and maximum current level is then transferred from the first device 102 to the second device 104.

Figure 2:
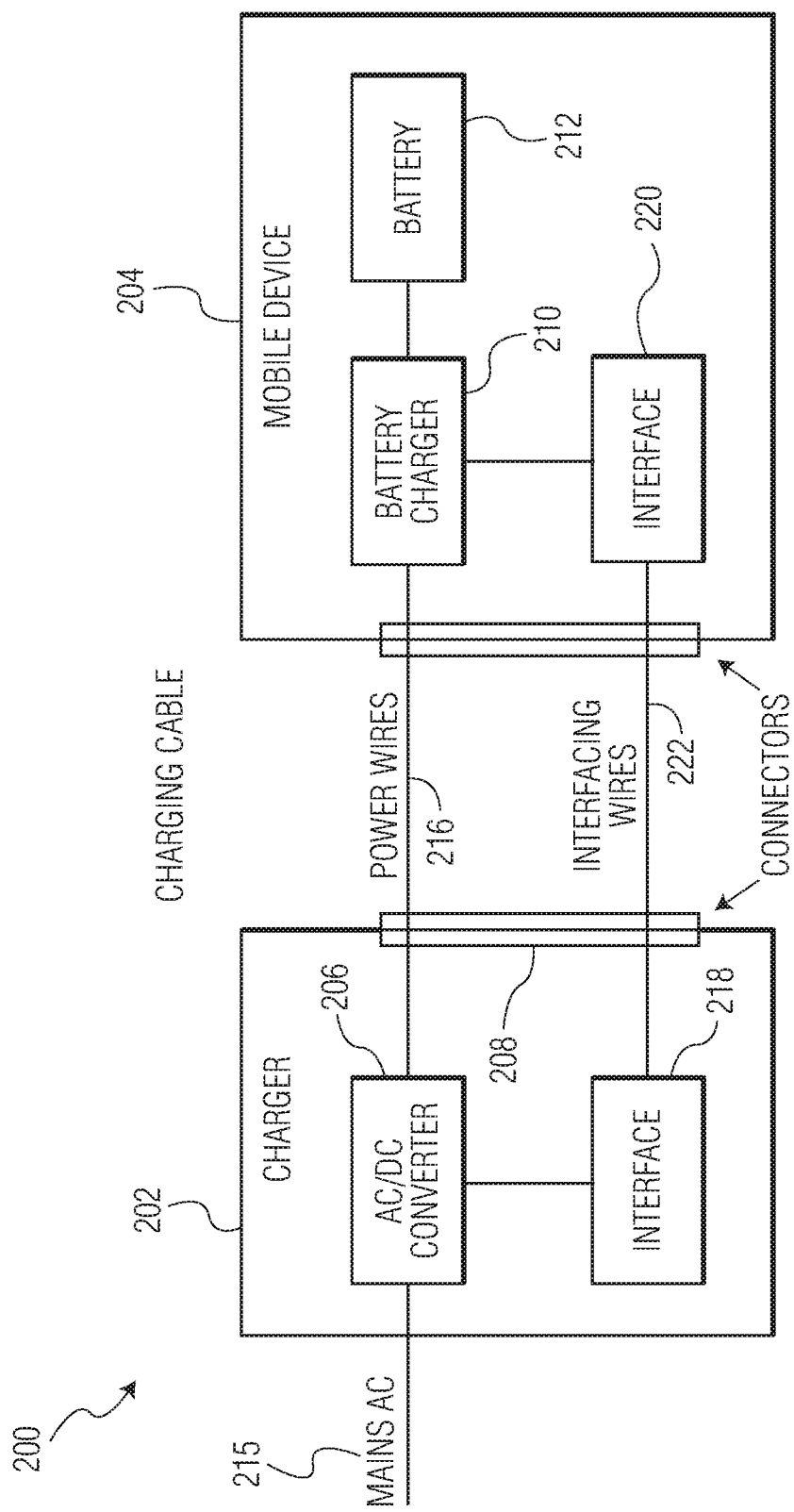
FIG. 2 is a second example of charging between a first device and a second device.

FIG. 2 is a second example 200 of charging between a first device 202 and a second device 204. In this example the first device 202 is a charger and the second device 204 is a mobile device.

The first device 202 includes an AC/DC converter 206, a first connector 208, and a first interface circuit 218. The second device 204 includes a battery charger 210, a battery 212, a second connector 214, and a second interface circuit 220.

The first device 202 is connected to a mains AC 215 (e.g. an AC wall outlet power source) and a first end of a charging cable. The second device 204 is coupled to a second end of the charging cable. The charging cable includes a set of power wires 216 and a set of interface wires 222.

In this example 200, the first device 202 is a smart charger and the additional communication interface circuits 218, 220 and wires 222 communicate the second device's 204 charging parameters (e.g. acceptable voltage and current levels) and the first device's 202 charging parameters (e.g. ability of the smart charger to provide voltage and current to the second device 204). Such interface communications enables boost charging and/or fast charging in some example embodiments.

Smart chargers thus can exchange device type information through the interface connection 218, 220, 222. Certain types of second devices 204 have certain voltage, current and power parameters, and the smart charger adjusts its output to fall within those parameters. Some smart chargers also ask the second device 204 for its battery's current charge state.

An ability to charge mobile devices, such as mobile phones, faster however is beneficial. Faster charging, in some example embodiments, requires higher charging currents. When applying such high charging currents, a sudden disconnect by a user (e.g. by pulling out a charging cable connector plug) may result in damage to the connector and/or the electronic circuits because of arcing. This is a spark occurring on the terminals of the connectors induced by a sudden discontinuity of the charging current.

Figure 3:
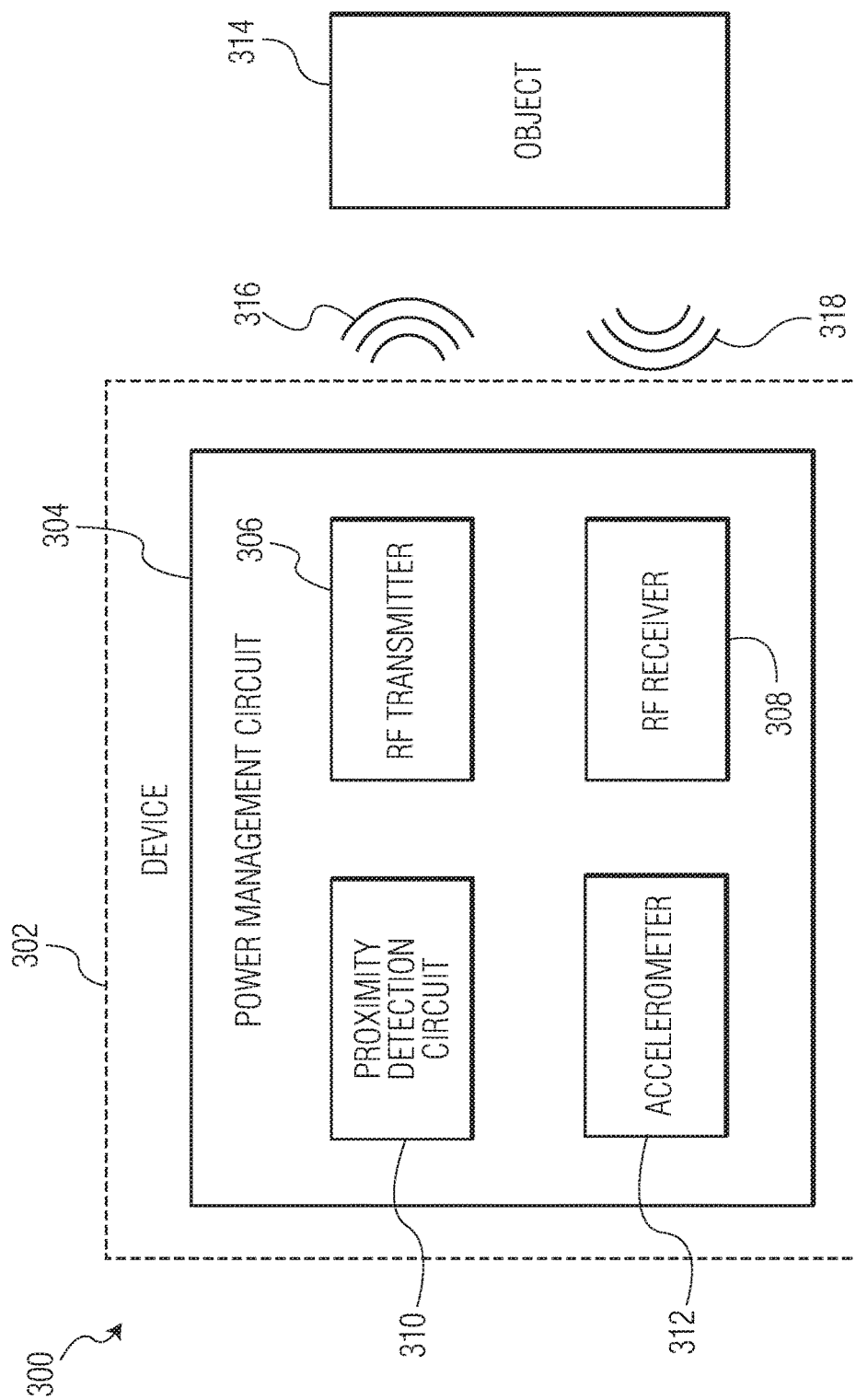
FIG. 3 is a first example of a power management circuit in a device.

FIG. 3 is a first example 300 of a power management circuit 304 in a device 302. The power management circuit 304 includes an RF transmitter 306, an RF receiver 308, and a proximity detection circuit 310. The power management circuit 304 presents an example embodiment of a circuit for permitting faster charging using higher currents without damaging the device 302.

The power management circuit 304 is configured to charge the device 302 at a first power level and a second power level. The RF transmitter 306 is configured to generate a transmitted RF signal 316 having a set of transmitted RF signal attributes. The RF receiver 308 is configured to detect a received RF signal 318 from a reflected version of the transmitted RF signal 316 which interacts with an object 314.

The RF signal attributes include at least: amplitude, phase, impedance, and RF signal power level. The object 314 is herein defined broadly to include at least: a user's hand, another device, a desk surface, a smartphone, a battery charger, a user's skin, or a user's clothes.

The received RF signal 318 has a set of received RF signal attributes. The proximity detection circuit 310 is configured to transition the device 302 from the first power level (e.g. for charging) to the second power level (e.g. for charging) in response to a preselected difference between the transmitted RF signal 316 attributes and the received RF signal 318 attributes. Thus example embodiments of the power management circuit 304 may or may not be configured to be connected to a physical charging cable. The power management circuit 304 may put the device 302 (e.g. a smartphone) in a lower or higher power state for a variety of reasons (e.g. for high power wireless charging).

In one example embodiment the preselected difference between the transmitted RF signal 316 attributes and the received RF signal 318 attributes is a range (e.g. phase difference between 90 degrees and 270 degrees). In another example embodiment the preselected difference between the transmitted RF signal 316 attributes and the received RF signal 318 attributes is a variation (i.e. non-steady state) from a baseline (i.e. steady-state) RF signal attribute. Note in various example embodiments, the proximity of an object can be detected even if only one of the attributes of the sets 316, 318 differ.

Figure 4:
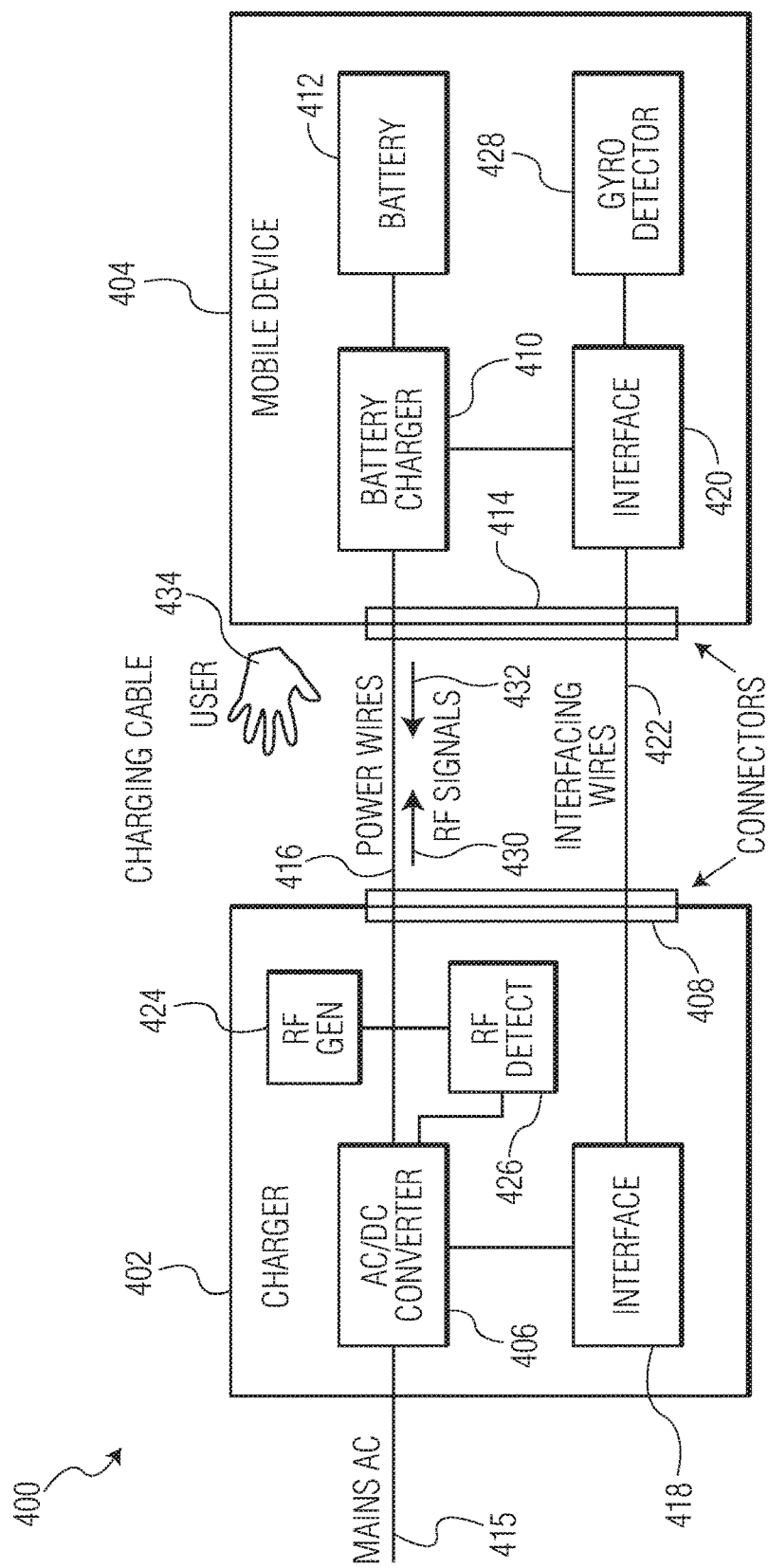
FIG. 4 is an example of a power management circuit distributed between a first device and a second device.
Figure 5:
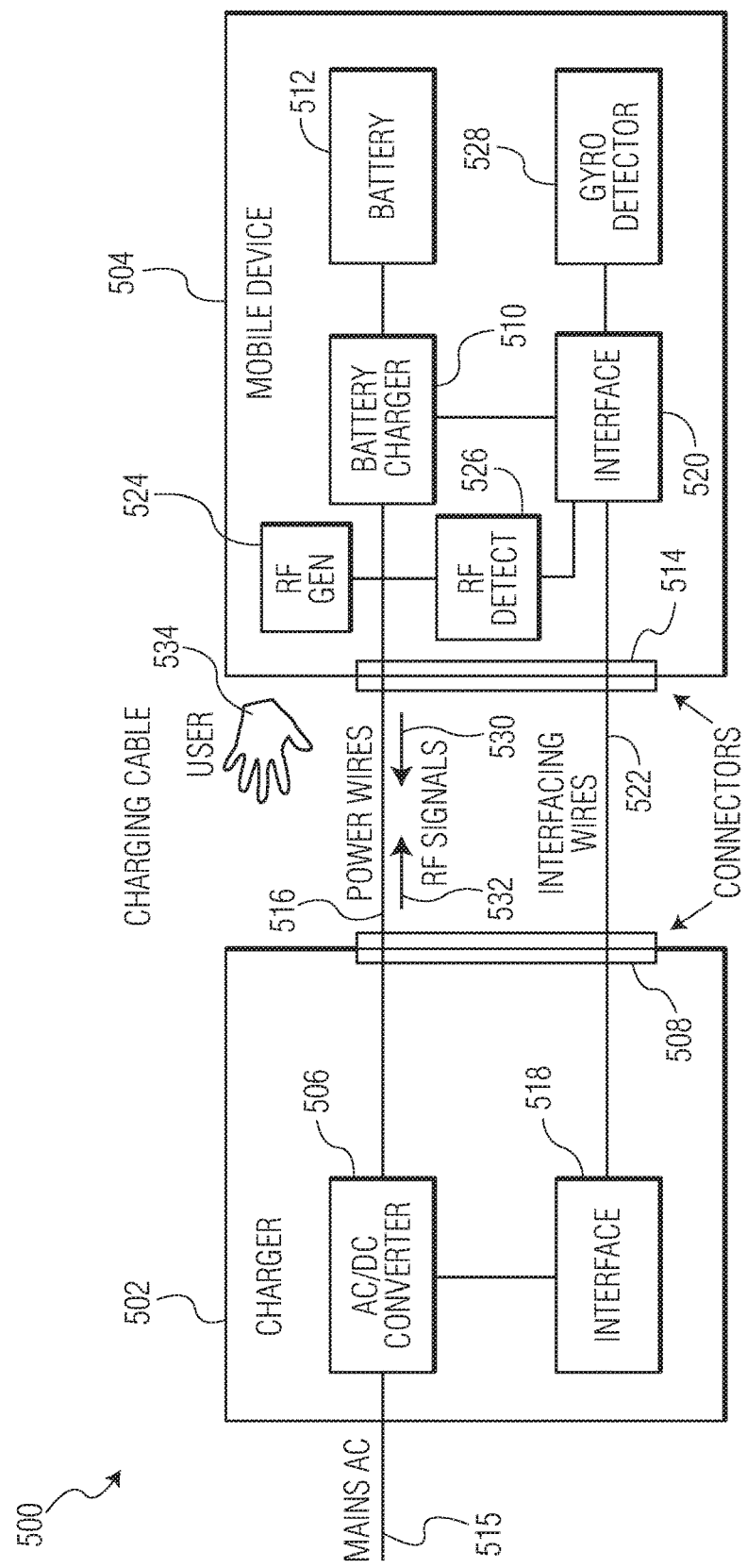
FIG. 5 is a second example of charging between a first device and a second device using a power management circuit.
Figure 6:
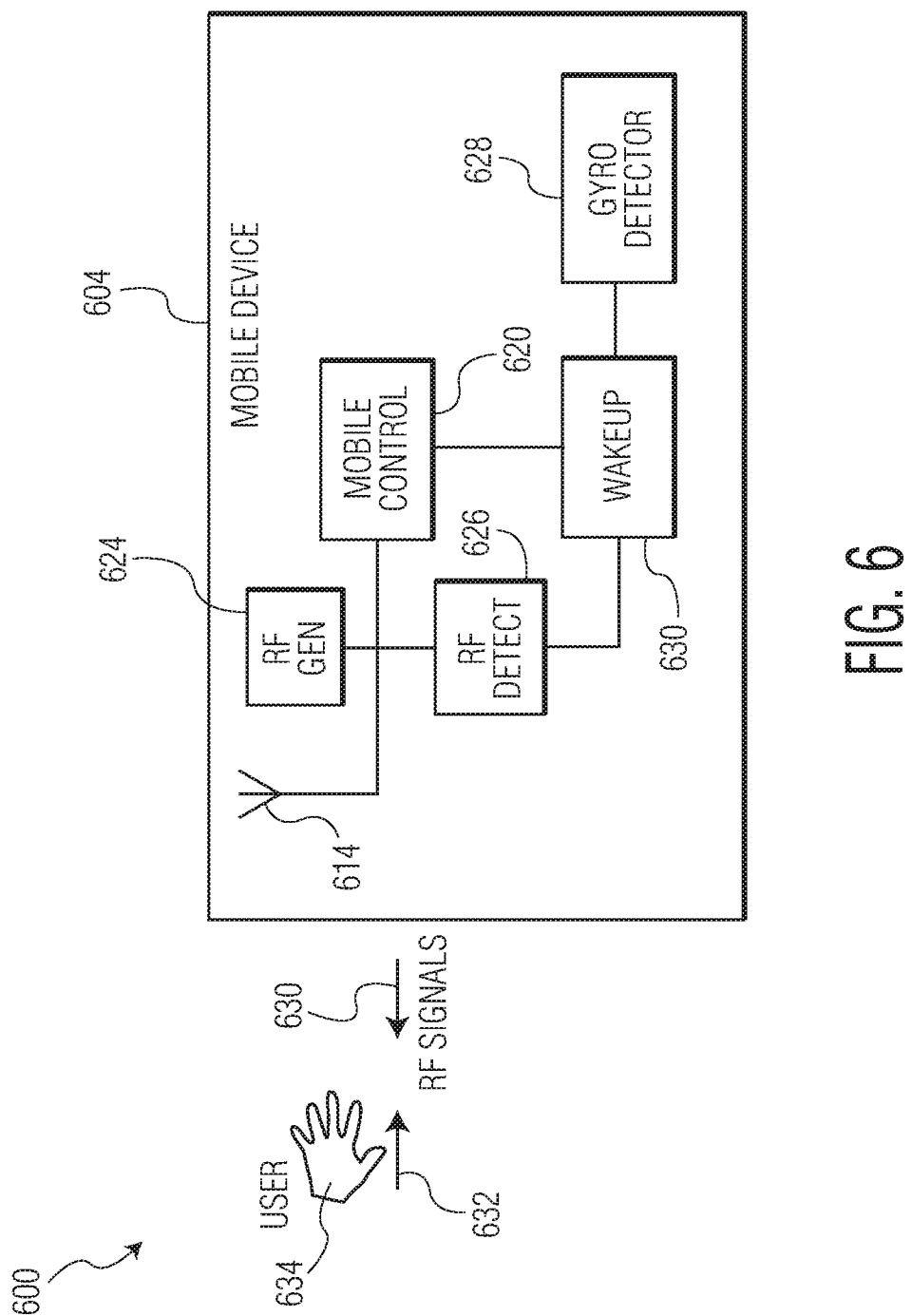
FIG. 6 is a third example of charging between a first device and a second device using a power management circuit.

Thus as an example, to avoid voltage spikes and arcing, the power management circuit 304 shifts the device 302 to a lower charging current level, or switches the device 302 completely off before disconnect by a user putting the device 302 in a state where an arc or voltage surge could occur (e.g. pulling out a charging cable, see FIGS. 4, 5, 6, connected to a device such as a mobile device, a smartphone, tablet, or a laptop).

In some example embodiments, the RF signals 316, 318 are within ISM (Industrial, Scientific, and Medical Radio) Bands so as to avoid interference with other device 302 transmissions. In other embodiments NFC (Near Field Communications) functionality can be added for necessary communications.

The transmitted RF signal 316 in some example embodiments can be pulsed for low power operation. The transmitted RF signal's 316 repetition frequency depends on the required reaction time for the device 302 to be switched between high and low power modes. For example, a user about to pick up the device 302 or disconnect a charging cable may need a faster response than if the proximity detection circuit 310 is used to wake-up the device 302.

Additionally an accelerometer 312 (i.e. gyro detector) can be added to detect movement of the device 302 (e.g. intentional movement by a user or some other force such as falling off a table), thereby causing the power management circuit 304 to command a reduction in a charging or other current.

In some example embodiments, proximity detection and movement detection work in combination for certain high to low power mode shifts, and in other example shift the device 302 from high to low (or low to high) power mode individually.

FIG. 4 is an example 400 of a power management circuit distributed between a first device 402 and a second device 404. In this example the first device 402 is a charger and the second device 404 is a mobile device.

The first device 402 includes an AC/DC converter 406, a first connector 408, a first interface circuit 418, an RF transmitter 424, and an RF receiver 426. Functionality for the proximity detection circuit is distributed between the first interface circuit 418, the RF transmitter 424 and the RF receiver 426.

The second device 404 includes a battery charger 410, a battery 412, a second connector 414, a second interface circuit 420 and an accelerometer 428 (e.g. gyro detector).

The first device 402 is connected to a mains AC 415 (e.g. an AC wall outlet power source) and a first end of a charging cable. The second device 404 is coupled to a second end of the charging cable. The charging cable includes a set of power wires 416 and a set of interface wires 422.

The RF transmitter 424 generates and transmits an RF signal 430 over the cable and the RF receiver 426 receives RF signal 432 for proximity detection of an object 434 (e.g. a hand in this example).

The power wires 416 between the charger 402 and mobile device 404 conduct current to charge the battery 412 of the mobile device 404. The transmitted RF signal 430 and received RF signal 432 on the power wires 416, enable the proximity detection circuit to measure RF impedance of the charging wires 416 and to detect any changes due to the proximity of the hand 434. The RF signal can be inserted on the power wires 416 in the cable, but alternatively on the interface wires 422.

The proximity detection circuit detects if the mobile device 404 is in a steady state, and thus can be charged by the charger 402 at a high power level. However, once the hand 434 comes near or touches the cable, the RF impedance changes, and the proximity detection circuit reduces the charging power level to a lower power level to prevent damage to the cable or connectors 408, 414 at disconnect.

In some examples, especially in combination with the accelerometer 428 in the mobile device 404, the mobile device 404 will send a message to the charger 402 via the interface wires 422 requesting that the charging current be reduced. In this example, the proximity detection circuit is distributed between both the charger 402 and the mobile device 404.

FIG. 5 is a second example 500 of charging between a first device 502 and a second device 504 using a power management circuit. In this example the first device 502 is a charger and the second device 504 is a mobile device.

The first device 502 includes an AC/DC converter 506, a first connector 508, and a first interface circuit 518.

The second device 504 includes a battery charger 510, a battery 512, a second connector 514, a second interface circuit 520, an RF transmitter 524, an RF receiver 526, and an accelerometer 528 (e.g. gyro detector). Functionality for the proximity detection circuit is distributed between the second interface circuit 520, the RF transmitter 524, the RF receiver 526, and the accelerometer 528.

The first device 502 is connected to a mains AC 515 (e.g. an AC wall outlet power source) and a first end of a charging cable. The second device 504 is coupled to a second end of the charging cable. The charging cable includes a set of power wires 516 and a set of interface wires 522.

The RF transmitter 524 generates and transmits an RF signal 530 over the cable and the RF receiver 526 receives RF signal 532 for proximity detection of an object 534 (e.g. a hand in this example).

FIG. 6 is another example 600 a device 604 using a power management circuit. In this example embodiment, other device 604 functions use the proximity detection circuit (e.g. to wake-up a mobile device).

The second device 602 includes an antenna 614, an interface circuit 620, an RF transmitter 624, an RF receiver 626, an accelerometer 628 (e.g. gyro detector), and a wake-up circuit 630. Functionality for the proximity detection circuit is distributed between the interface circuit 620, the RF transmitter 624, the RF receiver 626, and the accelerometer 628.

The RF transmitter 624 generates and transmits an RF signal 630 over the antenna 614 and the RF receiver 626 receives RF signal 632 for proximity detection of an object 634 (e.g. a hand in this example).

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A power management circuit, wherein the power management circuit is configured to cause a device to be operated at a first power level and a second power level, the power management circuit comprising:
    an RF transmitter configured to generate an RF signal having a set of transmitted RF signal attributes;
    an RF receiver configured to detect the RF signal having a set of received RF signal attributes; and
    a proximity detection circuit configured to transition wired charging of the device from the first power level to the second power level in response to a preselected difference between the set of transmitted RF signal attributes and the set of received RF signal attributes, wherein the device receives the first power level and the second power level over a connector coupled to an external surface of the device, the first power level corresponds to a first current and/or voltage level for charging the device that is greater than a power level that would damage the device and/or connector in response to disconnection of the connector from the device, and the second power level corresponds to a second current and/or voltage level for charging the device that is less than the power level that would damage the device and/or connector in response to disconnection of the connector from the device.

2. The power management circuit of claim 1, wherein the first and second power levels are non-zero.

3. The power management circuit of claim 1, wherein the set of transmitted RF signal attributes and the set of received RF signal attributes include at least one of an amplitude, a phase, an impedance, and an RF signal power level.

4. The power management circuit of claim 1, wherein the set of transmitted RF signal attributes and the set of received RF signal attributes are configured to vary based on at least one of a proximity of a user's hand, skin or clothing to the device, a proximity of an object next to the device, and a proximity of a user's hand to a cable connected to the device.

5. The power management circuit of claim 1, wherein the proximity detection circuit is configured to transition the device from the first power level to the second power level in response to a preselected variation in the difference between the set of transmitted RF signal attributes and the set of received RF signal attributes over a preselected time period.

6. The power management circuit of claim 5, wherein the proximity detection circuit is configured to not transition the device from the first power level to the second power level after the preselected variation in the difference between the transmitted set of attributes and the received set of attributes does not vary over the preselected time period.

7. The power management circuit of claim 1, further comprising;
    an accelerometer configured to detect movement of the device.

8. The power management circuit of claim 7, wherein the proximity detection circuit is configured to transition the device from the first power level to the second power level in response to either or both the preselected difference between the set of transmitted RF signal attributes and the set of received RF signal attributes, or movement of the device.

9. The power management circuit of claim 1, wherein the power management circuit is embedded in at least one of a battery charger, a mobile charger, or a battery powered device.

10. The power management circuit of claim 1, further comprising;
    a power source, wherein the power source is at least one of a main AC source, or another battery; and the proximity detection circuit is configured to transition the power source from the first power level to the second power level in response to the preselected difference between the set of transmitted RF signal attributes and the set of received RF signal attributes.

11. The power management circuit of claim 1, wherein the RF transmitter and RF receiver are coupled to the connector; and the connector is configured to transmit and receive the RF signal.

12. The power management circuit of claim 1, wherein the RF transmitter is configured to pulse the RF signal, wherein a frequency of the RF signal is set based on a predefined rate at which the preselected difference between the set of transmitted RF signal attributes and the set of received RF signal attributes changes, and a frequency of the RF signal is set based on a predefined rate at which a user's hand can disrupt charging of the device.

13. The power management circuit of claim 1, further comprising:
    a power source, wherein the connector is configured to carry the RF signal and couple the power source to the device, and the proximity detection circuit is configured to transition the device from the first power level to the second power level in response to an object near the connector.

14. The power management circuit of claim 1, wherein the damage includes at least one of an arc, a voltage spike, and a voltage surge.

15. An article of manufacture including at least one non-transitory, tangible machine readable storage medium containing executable machine instructions for power management in a power management circuit comprising a power management circuit, an RF transmitter, an RF receiver, and a proximity detection circuit, wherein the article of manufacture comprises:
    instructions for configuring a device to be operated at a first power level or a second power level in response to control signals from the power management circuit;
    instructions for generating an RF signal having a set of transmitted RF signal attributes with the RF transmitter;
    instructions for detecting the RF signal having a set of received RF signal attributes with the RF receiver; and
    instructions for transitioning wired charging of the device from the first power level to the second power level in response to a preselected difference between the set of transmitted RF signal attributes and the set of received RF signal attributes with the proximity detection circuit.

16. A method for power management, comprising:
    configuring a device to be operated at a first power level or a second power level;

generating an RF signal having a set of transmitted RF signal attributes;
detecting the RF signal having a set of received RF signal attributes; and
transitioning wired charging of the device from the first power level to the second power level in response to a preselected difference between the set of transmitted RF signal attributes and the set of received RF signal attributes.

* * * * *